(12) United States Patent
Tanaka et al.

(10) Patent No.: US 12,324,086 B2
(45) Date of Patent: Jun. 3, 2025

(54) FINE PARTICLE MANUFACTURING APPARATUS AND FINE PARTICLE MANUFACTURING METHOD

(71) Applicants: NATIONAL UNIVERSITY CORPORATION KANAZAWA UNIVERSITY, Kanazawa (JP); NISSHIN SEIFUN GROUP INC., Tokyo (JP)

(72) Inventors: Yasunori Tanaka, Kanazawa (JP); Naoto Kodama, Kanazawa (JP); Kazuki Onda, Kanazawa (JP); Shu Watanabe, Fujimino (JP); Keitaroh Nakamura, Fujimino (JP); Shiori Sueyasu, Fujimino (JP); Tomoya Watanabe, Fujimino (JP)

(73) Assignees: NATIONAL UNIVERSITY CORPORATION KANAZAWA UNIVERSITY, Kanazawa (JP); NISSHIN SEIFUN GROUP INC., Tokyo (JP)

( * ) Notice: Subject to any disclaimer, the term of this patent is extended or adjusted under 35 U.S.C. 154(b) by 863 days.

(21) Appl. No.: 17/435,665

(22) PCT Filed: Mar. 1, 2019

(86) PCT No.: PCT/JP2019/008186
§ 371 (c)(1),
(2) Date: Sep. 1, 2021

(87) PCT Pub. No.: WO2020/178915
PCT Pub. Date: Sep. 10, 2020

(65) Prior Publication Data
US 2022/0141946 A1    May 5, 2022

(51) Int. Cl.
*B01J 19/08*    (2006.01)
*C01B 33/021*    (2006.01)
*H05H 1/30*    (2006.01)

(52) U.S. Cl.
CPC ............. *H05H 1/30* (2013.01); *B01J 19/08* (2013.01); *C01B 33/021* (2013.01);
(Continued)

(58) Field of Classification Search
CPC ..... H05H 17/30; H05H 2245/20; B01J 19/08; B01J 2219/0894; C01B 33/021; C01P 2004/03; C01P 2004/64
See application file for complete search history.

(56) References Cited

U.S. PATENT DOCUMENTS

2008/0006954 A1    1/2008  Yubuta et al.
2012/0201266 A1    8/2012  Boulos et al.

FOREIGN PATENT DOCUMENTS

JP    H06279015 A    10/1994
JP    2005-505906 A    2/2005
(Continued)

OTHER PUBLICATIONS

English machine translation of JP2012055840A (2012).*
English machine translation of JP2010131577A (2010).*
Tial, Mai Kai Suan, et al. "Uniform surface oxidation of an Si substrate by a planar modulated inductively coupled thermal plasma with molecular gas feed." Plasma Chemistry and Plasma Processing 37 (2017): 857-876.*
(Continued)

*Primary Examiner* — Richard M Rump
(74) *Attorney, Agent, or Firm* — MUNCY, GEISSLER, OLDS & LOWE, P.C.

(57) ABSTRACT

A fine particle manufacturing apparatus and a fine particle manufacturing method are provided. The apparatus includes a raw material supply part supplying a raw material; a plasma torch in which the thermal plasma flame is generated and the raw material supplied by the raw material supply part is vaporized by using the thermal plasma flame to form a mixture in a gas phase state; and a plasma generation part
(Continued)

generating the thermal plasma flame inside the plasma torch. The plasma generation part includes a first coil encircling the plasma torch; a second coil encircling the plasma torch and disposed below the first coil; a first power supply part supplying a high-frequency electric current to the first coil; and a second power supply part supplying an amplitude-modulated high-frequency electric current to the second coil. The first coil and the second coil are arranged in the longitudinal direction of the plasma torch.

10 Claims, 8 Drawing Sheets

(52) U.S. Cl.
CPC ... *B01J 2219/0894* (2013.01); *C01P 2004/03* (2013.01); *C01P 2004/64* (2013.01); *H05H 2245/20* (2021.05)

(56) References Cited

FOREIGN PATENT DOCUMENTS

| JP | 2006-247446 A | 9/2006 |
|---|---|---|
| JP | 2012-055840 A | 3/2012 |
| JP | 2012-521617 A | 9/2012 |
| JP | 2013-194265 A | 9/2013 |
| JP | 2017105680 A | 6/2017 |
| TW | 201129499 A1 | 9/2011 |

OTHER PUBLICATIONS

Katsuya Kuraishi et al., "Temperature Behavior in a Tandem Type of Modulated Induction Thermal Plasma for Materials Processings", Jun. 13, 2013, Journal of Physics: Conference Series, vol. 441, 15 pages.

Onda et al., "Synthesis Test with Large Modulation of Lower-Coil Current using Tandem Type of Induction Thermal Plasmas", The Japan Society of Applied Physics, Sep. 18, 2018, The 79th JSAP Autumn Meeting, 3 pages.

Onda et al., "A Numerical Study on Tandem Type of Induction Thermal Plasma with Lower-Coil Current Modulation", The Papers of Joint Technical Meeting on electrical discharges, Institute of Electrical Engineers of Japan, May 17, 2018, pp. 37-42.

Onda, Kazuki et al., Partial translation of "Silicon Nanoparticle Synthesis Test using Tandem Type of Induction Thermal Plasmas with Large Modulation of Lower-Coil Current," Institute of Electrical Engineers of Japan, The Annual Meeting Record, I.E.E. Japan, Mar. 14, 2018, (1 page).

Onda et al., "Synthesis Test with Large Modulation of Lower-Coil Current using Tandem Type of Induction Thermal Plasmas," (with an English abstract), The Japan Society of Applied Physics, Sep. 18, 2018, The 79th JSAP Autumn Meeting, 3 pages.

Onda et al., "A Numerical Study on Tandem Type of Induction Thermal Plasma with Lower-Coil Current Modulation," (with an English abstract), The Papers of Joint Technical Meeting on electrical discharges, Institute of Electrical Engineers of Japan, May 17, 2018, pp. 37-42.

* cited by examiner

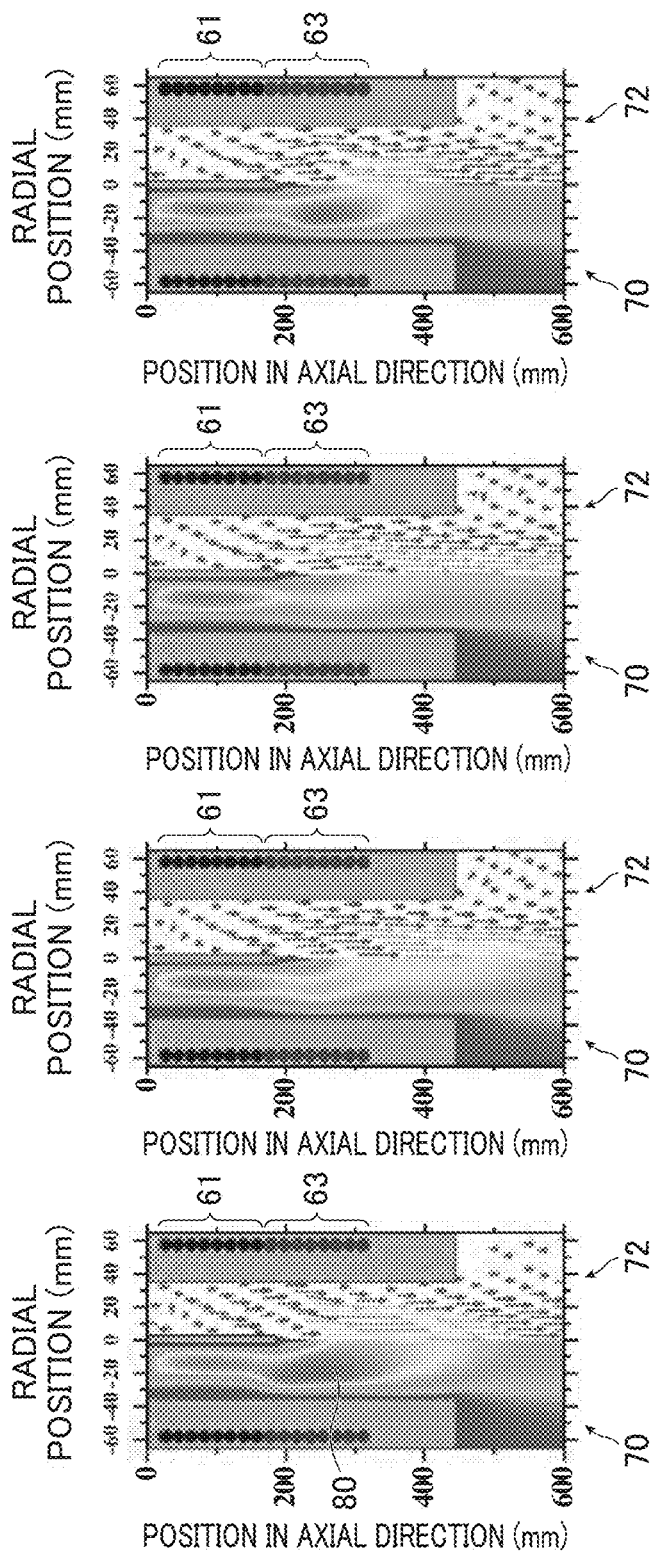

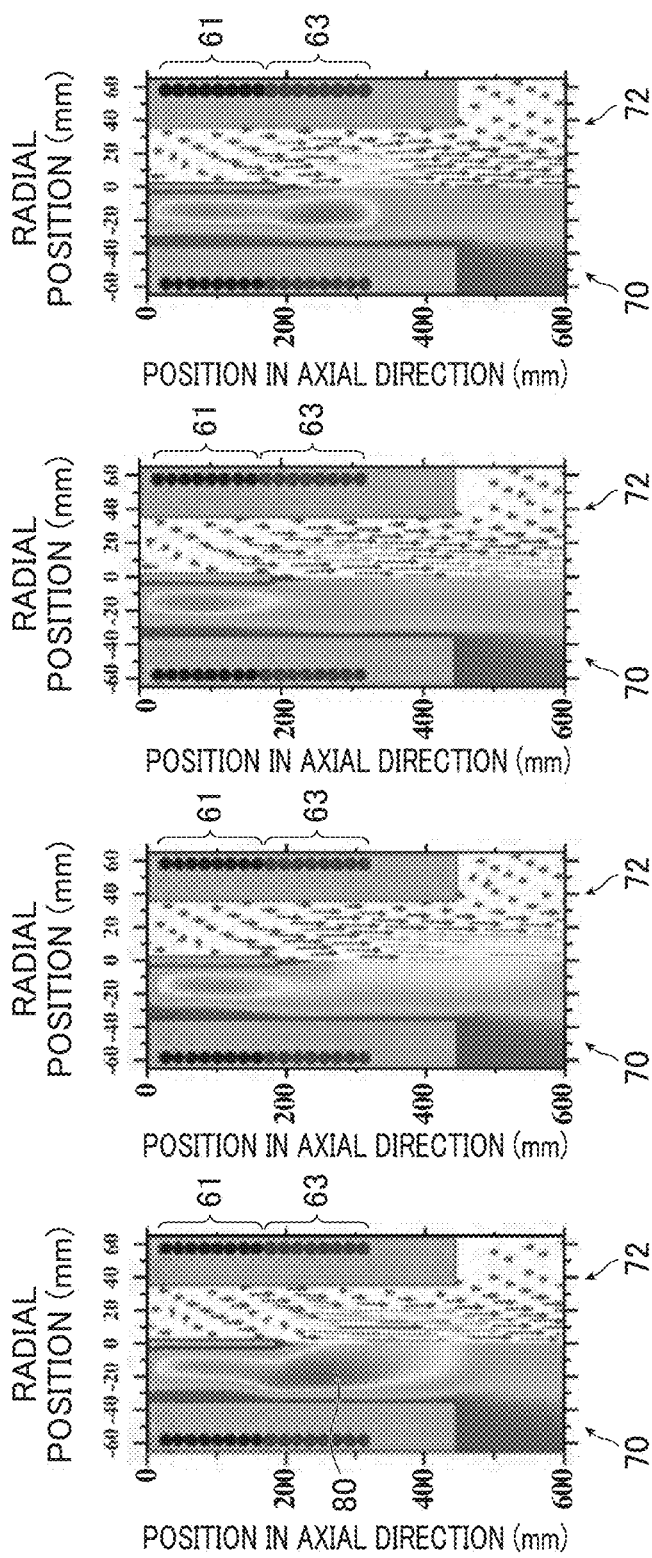

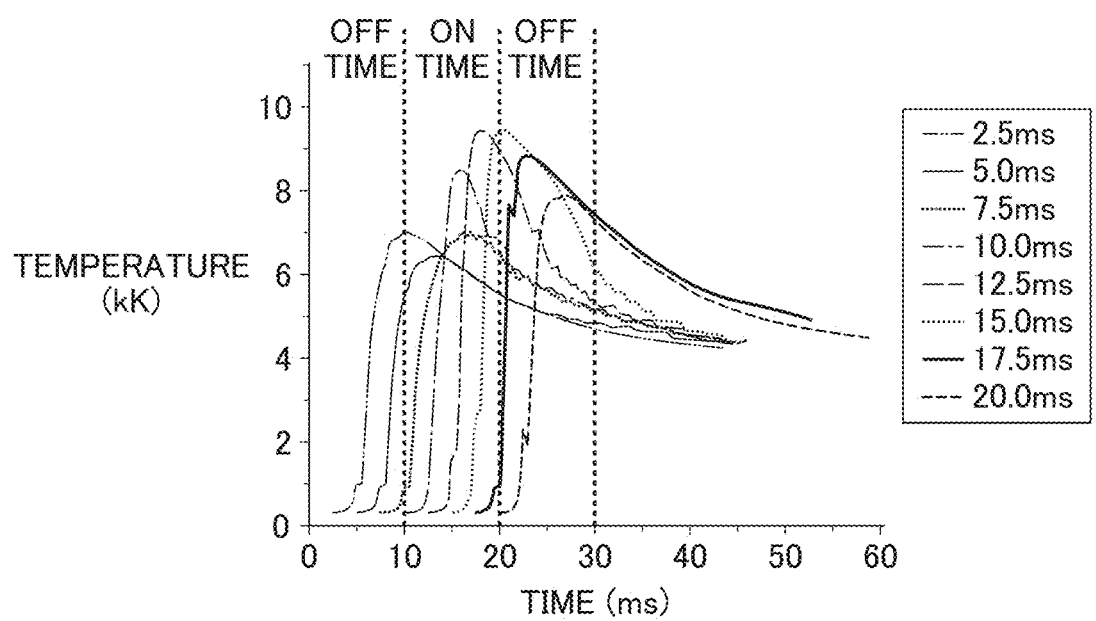
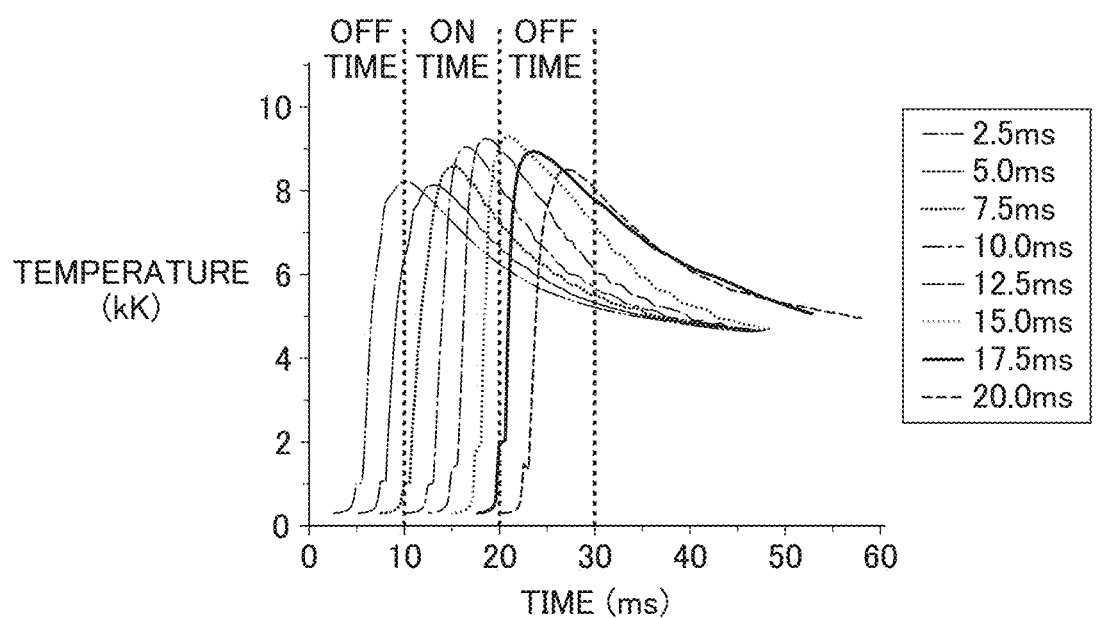

FINE PARTICLE MANUFACTURING APPARATUS AND FINE PARTICLE MANUFACTURING METHOD

TECHNICAL FIELD

The present invention relates to a fine particle manufacturing apparatus and a fine particle manufacturing method using a thermal plasma flame, particularly to a fine particle manufacturing apparatus and a fine particle manufacturing method that generate a thermal plasma flame by electromagnetic induction by use of two coils and two independent high frequency power sources that separately supply high frequency currents to the two coils, thereby producing fine particles.

BACKGROUND ART

At present, fine particles such as silicon fine particles, oxide fine particles, nitride fine particles and carbide fine particles are used in a wide variety of fields. One example of a method of manufacturing such fine particles is a gas-phase process. Exemplary gas-phase processes include chemical processes in which various gases or the like are chemically reacted at high temperature and physical processes in which a substance is irradiated with a beam such as an electron beam or a laser beam so as to be decomposed and evaporated, thereby generating fine particles.

Another gas-phase process is a thermal plasma process. The thermal plasma process is a process for manufacturing fine particles by instantly evaporating feedstock in a thermal plasma flame and then quenching and solidifying the resulting evaporated product. The thermal plasma process has many advantages; for instance, the thermal plasma process is clean and highly productive, provides a high temperature and therefore is applicable to high melting point materials, and enables relatively easy complexing as compared to other gas-phase processes. Accordingly, the thermal plasma process is actively utilized as a method of manufacturing fine particles.

In a fine particle manufacturing method using a conventional thermal plasma process, for instance, a feedstock substance is powdered, the powdered feedstock (powdery feedstock, powder) is, together with carrier gas and the like, dispersed and directly supplied as the feedstock into thermal plasma, whereby fine particles are manufactured.

In addition, for instance, Patent Literature 1 describes a fine particle manufacturing method that involves dispersing a material used for manufacturing fine particles (raw material) in a dispersion medium to form a slurry, and as the feedstock, introducing the slurry into a thermal plasma flame while transforming the slurry into droplets, thereby manufacturing fine particles.

CITATION LIST

Patent Literature

Patent Literature 1: JP 2006-247446 A

Non-Patent Literature

Non-patent Literature 1: K. Kuraishi, et al., J. Phys. Conf. Ser., 441, 012016 (2013)

SUMMARY OF INVENTION

Technical Problems

For a fine particle manufacturing method, supplying feedstock together with carrier gas into a thermal plasma flame and, as in Patent Literature 1 stated above, supplying the raw material in the form of a slurry have been conventionally known. Among thermal plasma flames, however, in the case of induction thermal plasma generated by electromagnetic induction, a thermal plasma flame is sometimes destabilized due to disturbance from the outside.

To eliminate such destabilization of a thermal plasma flame caused by disturbance from the outside, for example, Non-patent Literature 1 proposes generating a thermal plasma flame by use of two coils and two independent high frequency power sources connected separately to the two coils.

Meanwhile, in addition to eliminating destabilization of a thermal plasma flame caused by disturbance from the outside as above, it has been required to control the particle size of obtained fine particles and provide the uniformity of obtained fine particles in particle size.

Further, even in the configuration for eliminating destabilization of a thermal plasma flame caused by disturbance from the outside as conventionally proposed, when a large amount of feedstock is supplied to a thermal plasma flame for the purpose of increasing the productivity of fine particles, the thermal plasma flame may be destabilized, e.g., extinguished, and therefore this configuration is not good enough to improve the productivity.

An object of the present invention is to provide a fine particle manufacturing apparatus and a fine particle manufacturing method that are capable of controlling the particle size of fine particles and efficiently manufacturing a large amount of fine particles having excellent uniformity in particle size.

Solution to Problems

In order to attain the above object, the present invention provides a fine particle manufacturing apparatus comprising: a feedstock supply section configured to supply feedstock for fine particle manufacturing into a thermal plasma flame; a plasma torch configured to allow the thermal plasma flame to be generated therein and, by use of the thermal plasma flame, evaporate the feedstock supplied by the feedstock supply section to transform the feedstock into a mixture in a gas phase state; and a plasma generation section configured to generate the thermal plasma flame inside the plasma torch, wherein the plasma generation section includes a first coil surrounding a periphery of the plasma torch, a second coil disposed under the first coil and surrounding the periphery of the plasma torch, a first power source section supplying high frequency current to the first coil, and a second power source section supplying amplitude-modulated high frequency current to the second coil, and the first coil and the second coil are arranged side by side in a longitudinal direction of the plasma torch.

It is preferable to have a gas supply section configured to supply quenching gas to the thermal plasma flame.

Preferably, the plasma generation section supplies amplitude-modulated high frequency current to the second coil by use of the second power source section and increases an amount of supply of the feedstock in a region where current amplitude of the amplitude-modulated high frequency current supplied to the second coil is high.

Preferably, a current value of the amplitude-modulated high frequency current supplied to the second coil is 0 ampere in a region where current amplitude of the amplitude-modulated high frequency current is low.

Preferably, the feedstock supply section supplies the feedstock into the thermal plasma flame with the feedstock being dispersed in a particulate form.

Preferably, the feedstock supply section disperses the feedstock in liquid to obtain a slurry and transforms the slurry into droplets to supply the droplets into the thermal plasma flame.

The present invention also provides a fine particle manufacturing method using a thermal plasma flame generated inside a plasma torch, there being provided a first coil surrounding a periphery of the plasma torch, a second coil disposed under the first coil and surrounding the periphery of the plasma torch, a first power source section supplying high frequency current to the first coil, and a second power source section supplying amplitude-modulated high frequency current to the second coil, the first coil and the second coil being arranged side by side in a longitudinal direction of the plasma torch, and the thermal plasma flame being generated by the first power source section and the second power source section, the method comprising: a first step of supplying feedstock for fine particle manufacturing to the thermal plasma flame generated inside the plasma torch; and a second step of evaporating the feedstock by use of the thermal plasma flame to transform the feedstock into a mixture in a gas phase state and cooling the mixture, wherein in the first step and the second step, the second power source section supplies amplitude-modulated high frequency current to the second coil.

Preferably, in the second step, quenching gas is supplied to the thermal plasma flame to cool the mixture in a gas phase state.

Preferably, in the first step, amplitude-modulated high frequency current is supplied to the second coil by the second power source section, and an amount of supply of the feedstock is increased in a region where current amplitude of the amplitude-modulated high frequency current supplied to the second coil is high.

Preferably, a current value of the amplitude-modulated high frequency current supplied to the second coil is 0 ampere in a region where current amplitude of the amplitude-modulated high frequency current is low.

Preferably, in the first step, the feedstock is supplied into the thermal plasma flame with the feedstock being dispersed in a particulate form.

Preferably, in the first step, the feedstock is dispersed in liquid to obtain a slurry, the slurry is transformed into droplets, and the droplets are supplied into the thermal plasma flame.

Advantageous Effects of Invention

With the fine particle manufacturing apparatus and the fine particle manufacturing method according to the present invention, it is possible to control the particle size of fine particles and efficiently manufacture a large amount of fine particles having excellent uniformity in particle size.

BRIEF DESCRIPTION OF DRAWINGS

FIGS. 6A to 6D are schematic views showing examples of temperature distributions and flow fields at 50% SCL in an analysis model of a plasma torch.

FIGS. 7A to 7D are schematic views showing examples of temperature distributions and flow fields at 0% SCL in the analysis model of the plasma torch.

FIG. 8 is a graph showing examples of temperature histories of virtual particles provided into an analysis model of a plasma torch at 50% SCL, with time.

FIG. 9 is a graph showing examples of temperature histories of virtual particles provided into the analysis model of the plasma torch at 0% SCL, with time.

DESCRIPTION OF EMBODIMENTS

A fine particle manufacturing apparatus and a fine particle manufacturing method according to the present invention are described below in detail based on a preferred embodiment shown in the accompanying drawings.

Figure 1:
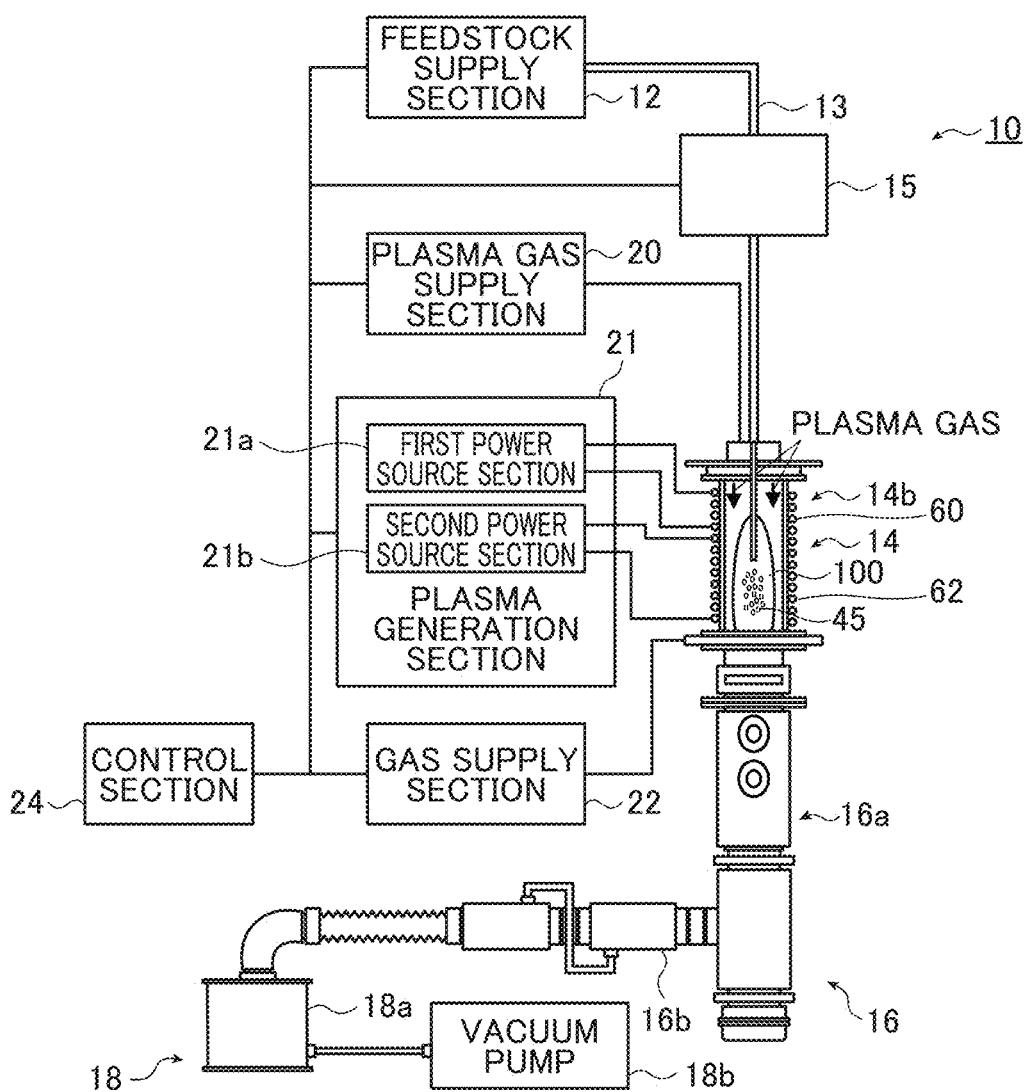
FIG. 1 is a schematic view showing an example of a fine particle manufacturing apparatus according to an embodiment of the invention.
Figure 2:
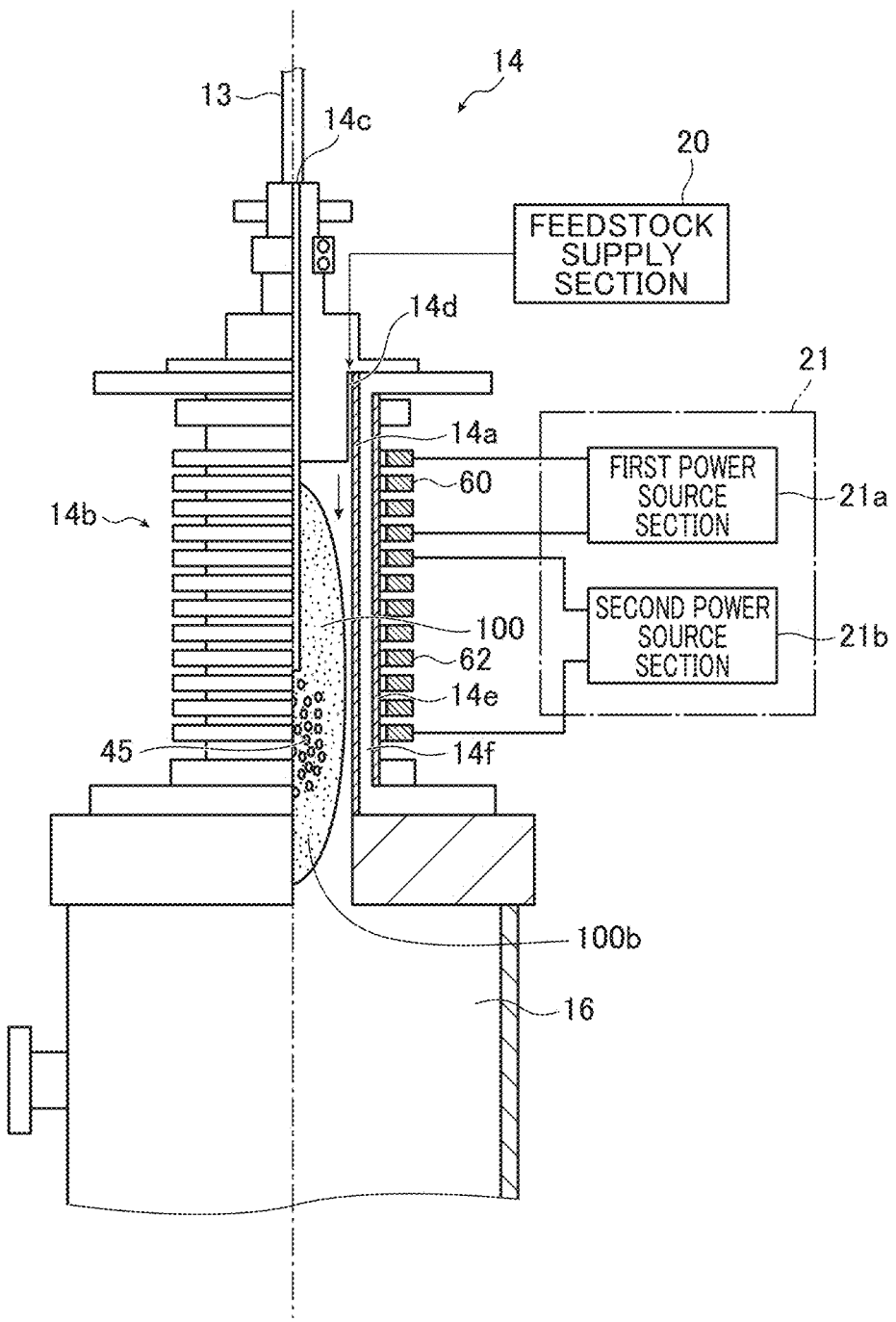
FIG. 2 is a partial cross-sectional view schematically showing an example of a plasma torch of the fine particle manufacturing apparatus according to the embodiment of the invention.

FIG. 1 is a schematic view showing an example of the fine particle manufacturing apparatus according to the embodiment of the invention, and FIG. 2 is a partial cross-sectional view schematically showing an example of a plasma torch of the fine particle manufacturing apparatus according to the embodiment of the invention.

A fine particle manufacturing apparatus 10 (hereinafter referred to simply as "manufacturing apparatus 10") shown in FIG. 1 is used for manufacturing nanosized fine particles by use of feedstock for fine particle manufacturing. For instance, powder is used as the feedstock for fine particle manufacturing.

The manufacturing apparatus 10 can manufacture any fine particles with no limitation in the type, specifically, such fine particles as, in addition to metal fine particles, oxide fine particles, nitride fine particles, carbide fine particles and oxynitride fine particles by changing the composition of the feedstock.

The manufacturing apparatus 10 includes a feedstock supply section 12, a plasma torch 14, a chamber 16, a collection section 18, a plasma gas supply section 20, a plasma generation section 21, a gas supply section 22, and a control section 24.

The feedstock supply section 12 is connected to the plasma torch 14 through a hollow supply tube 13.

The supply tube 13 between the feedstock supply section 12 and the plasma torch 14 may be provided with an intermittent supply section 15 as described later. The intermittent supply section 15 is not an essential element in the manufacturing apparatus 10.

The chamber 16 is disposed below the plasma torch 14, and the collection section 18 is disposed downstream from the chamber 16. The plasma generation section 21 is connected to the plasma torch 14, and a thermal plasma flame 100 is generated in the plasma torch 14 by means of the plasma generation section 21 as described later.

The feedstock supply section 12 is provided to supply feedstock for fine particle manufacturing into the thermal plasma flame 100 generated in the plasma torch 14.

The type of the feedstock supply section 12 is not particularly limited as long as it can supply the feedstock into the thermal plasma flame 100, and the following two types are applicable: one supplying the feedstock into the thermal plasma flame 100 with the feedstock being dispersed in a particulate form, and one slurrying the feedstock and transforming the obtained slurry into droplets to supply the droplets into the thermal plasma flame 100.

For example, in the case where powder is used as the feedstock for fine particle manufacturing, the feedstock needs to be dispersed in a particulate form when supplied into the thermal plasma flame 100 in the plasma torch 14. Therefore, the feedstock is for instance dispersed in carrier gas so that the feedstock in a particulate form is supplied. In this case, the feedstock supply section 12 supplies the feedstock powder in a fixed amount into the thermal plasma flame 100 in the plasma torch 14 whilst maintaining the feedstock powder to be in a dispersed state. For the feedstock supply section 12 having such a function, usable examples include devices disclosed in JP 3217415 B and JP 2007-138287 A.

For example, the feedstock supply section 12 includes a storage tank (not shown) storing feedstock powder, a screw feeder (not shown) transporting the feedstock powder in a fixed amount, a dispersion section (not shown) dispersing the feedstock powder transported by the screw feeder into a particulate form before the feedstock powder is finally sprayed, and a carrier gas supply source (not shown).

Together with carrier gas to which push-out pressure is applied from the carrier gas supply source, the feedstock powder is supplied into the thermal plasma flame 100 in the plasma torch 14 through the supply tube 13.

The configuration of the feedstock supply section 12 is not particularly limited as long as the feedstock supply section 12 can prevent the feedstock powder from agglomerating and spray the feedstock powder into the plasma torch 14 with the feedstock powder being dispersed in a particulate form and the dispersed state being maintained. Inert gases such as argon gas (Ar gas) and nitrogen gas are usable as the carrier gas, for example.

For the feedstock supply section 12 supplying the feedstock powder in the form of a slurry, the device disclosed in JP 2011-213524 A may be used, for example. In this case, the feedstock supply section 12 includes a vessel (not shown) storing a slurry (not shown) having feedstock powder dispersed in liquid such as water, an agitator (not shown) agitating the slurry in the vessel, a pump (not shown) applying high pressure to the slurry to supply the slurry into the plasma torch 14 through the supply tube 13, and an atomization gas supply source (not shown) supplying atomization gas used to transform the slurry into droplets and supply the droplets into the plasma torch 14. The atomization gas supply source corresponds to the carrier gas supply source. The atomization gas is also called carrier gas.

In the case where the feedstock is supplied in the form of a slurry, the feedstock powder is dispersed in liquid such as water to obtain a slurry. The mixing ratio between the feedstock powder and water in the slurry is not particularly limited and is, for example, 5:5 (50%:50%) in the mass ratio.

In the case where used is the feedstock supply section 12 slurrying the feedstock powder and supplying the obtained slurry in the form of droplets, atomization gas to which push-out pressure is applied from the atomization gas supply source is, together with the slurry, supplied into the thermal plasma flame 100 in the plasma torch 14 through the supply tube 13. The supply tube 13 has a two-fluid nozzle mechanism for spraying the slurry to the thermal plasma flame 100 in the plasma torch and transforming it into droplets, and using this mechanism, the slurry is sprayed to the thermal plasma flame 100 in the plasma torch 14. That is, this makes it possible to transform the slurry into droplets. Similarly to the carrier gas described above, inert gases such as argon gas (Ar gas) and nitrogen gas are usable as the atomization gas, for example.

Thus, the two-fluid nozzle mechanism is capable of applying high pressure to the slurry and atomizing the slurry with gas, i.e., the atomization gas (carrier gas), and is used as a method for transforming the slurry into droplets.

It should be noted that the nozzle mechanism is not limited to the two-fluid nozzle mechanism as above, and a single-fluid nozzle mechanism may also be used. As other methods, examples include a method which involves allowing a slurry to fall onto a rotating disk at a constant rate to transform the slurry into droplets (to form droplets) by the centrifugal force and a method which involves applying high voltage to a surface of a slurry to transform the slurry into droplets (to generate droplets).

The plasma torch 14 allows the thermal plasma flame 100 to be generated therein and, by use of the thermal plasma flame 100, evaporates the feedstock supplied by the feedstock supply section 12 to transform the feedstock into a mixture 45 in a gas phase state.

As shown in FIG. 2, the plasma torch 14 includes a quartz tube 14a and a high frequency oscillation coil 14b provided around the outer surface of the quartz tube 14a to surround the periphery of the plasma torch 14. The center portion of the top of the plasma torch 14 is provided with a supply port 14c into which the supply tube 13 is inserted, and a plasma gas supply port 14d is formed in the peripheral portion of the supply port 14c (on the same circumference).

For instance, powdery feedstock and the carrier gas such as argon gas or hydrogen gas are supplied into the plasma torch 14 through the supply tube 13.

The plasma gas supply port 14d is connected to the plasma gas supply section 20 via, for example, piping which is not shown. The plasma gas supply section 20 supplies plasma gas into the plasma torch 14 through the plasma gas supply port 14d. For the plasma gas, gases such as argon gas and hydrogen gas are used alone or in combination as appropriate, for instance.

A sheath gas supply section (not shown) supplying sheath gas into the plasma torch 14 may be provided in addition to the plasma gas supply section 20. For the sheath gas, the same gas as the plasma gas can be used.

The sheath gas supply section may be provided in place of the plasma gas supply section 20.

The outside of the quartz tube 14a of the plasma torch 14 is surrounded by a concentrically formed quartz tube 14e, and cooling water 14f is circulated between the quartz tubes 14a and 14e to cool the quartz tube 14a with the water, thereby preventing the quartz tube 14a from having an excessively high temperature due to the thermal plasma flame 100 generated in the plasma torch 14.

The plasma generation section 21 is provided to generate the thermal plasma flame 100 in the plasma torch 14 as described above. The plasma generation section 21 includes a first coil 60 surrounding the periphery of the plasma torch 14, a second coil 62 surrounding the periphery of the plasma torch 14, a first power source section 21a supplying high frequency current to the first coil 60, and a second power source section 21b supplying amplitude-modulated (AM-modulated) high frequency current to the second coil 62. The high frequency current supplied to the first coil 60 is also called first coil current, and the high frequency current supplied to the second coil 62 is also called second coil current.

The first coil 60 and the second coil 62 are arranged side by side in the longitudinal direction of the plasma torch 14, and the second coil 62 is disposed under the first coil 60.

The first power source section 21a and the second power source section 21b are both high frequency power sources and are independent of each other. It is preferable that the frequency of high frequency current of the first power source section 21a and the frequency of high frequency current of the second power source section 21b be different from each other in order to reduce magnetic coupling between the first coil 60 and the second coil 62. This configuration can suppress the influence of the power source sections on each other.

The first coil 60 and the second coil 62 constitute the high frequency oscillation coil 14b. The numbers of turns of the first coil 60 and the second coil 62 are not particularly limited and are suitably determined depending on the configuration of the manufacturing apparatus 10. Materials of the first coil 60 and the second coil 62 are also not particularly limited and are suitably determined depending on the configuration of the manufacturing apparatus 10.

With the use of the two coils and the two independent power source sections in the plasma generation section 21, a series structure of induction thermal plasma can be built. The provision of the series structure of induction thermal plasma makes it possible to generate a high-temperature field that is long in the axial direction of the plasma torch 14. When the long high-temperature field as above is used, it is possible to completely evaporate a high melting point material. A thermal plasma flame that is periodically switched between a high temperature state and a low temperature state having a lower temperature than that in the high temperature state at predetermined time intervals, i.e., that is time-modulated in terms of the temperature state, is called a modulated induction thermal plasma flame.

Figure 3A:
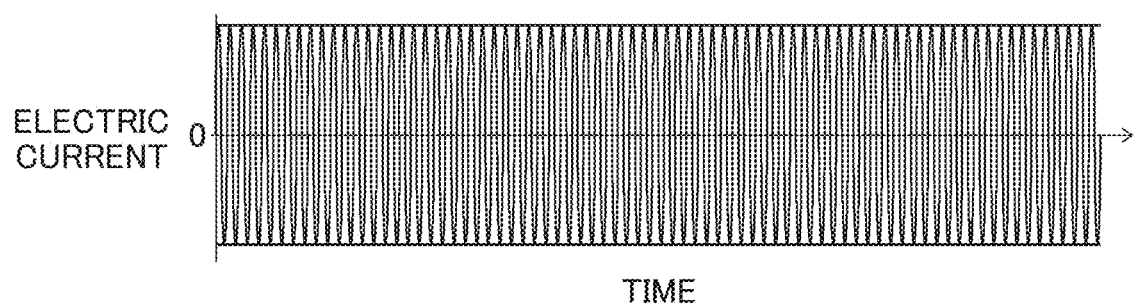
FIG. 3A is a schematic view showing an example of a waveform of high frequency current of a first power source section.

In the plasma generation section 21, for instance, the first power source section 21a supplies the first coil 60 with unmodulated high frequency current that is not subjected to amplitude modulation (see FIG. 3A). The second power source section 21b supplies the second coil 62 with amplitude-modulated high frequency current (see FIG. 3B).

When the unmodulated high frequency current (see FIG. 3A) is supplied to the first coil 60 and the amplitude-modulated high frequency current (see FIG. 3B) is supplied to the second coil 62, the thermal plasma flame 100 is generated in the plasma torch 14. The temperature of the thermal plasma flame 100 can be changed by use of the amplitude-modulated high frequency current supplied to the second coil 62, thereby controlling the temperature inside the plasma torch 14. The temperature state of the thermal plasma flame 100 is time-modulated, so that the temperature state of the thermal plasma flame 100 is periodically switched between the high temperature state and the low temperature state having a lower temperature than that in the high temperature state. With this configuration, the particle size of fine particles can be controlled, a large amount of fine particles with a smaller particle size can be obtained, and a large amount of fine particles can be efficiently manufactured.

It should be noted that by supplying unmodulated high frequency current to the first coil 60 to generate the thermal plasma flame 100, it is possible to stabilize the thermal plasma flame 100, and destabilization of the thermal plasma flame 100 can be suppressed even when high frequency current supplied to the second coil 62 is modulated. This configuration makes it possible to suppress a decrease in the temperature of the thermal plasma flame 100 even when, for instance, a large amount of feedstock is supplied to the thermal plasma flame 100. Consequently, a large amount of fine particles having excellent uniformity in particle size can be obtained. This also contributes to efficient manufacture of a large amount of fine particles.

Figure 3B:
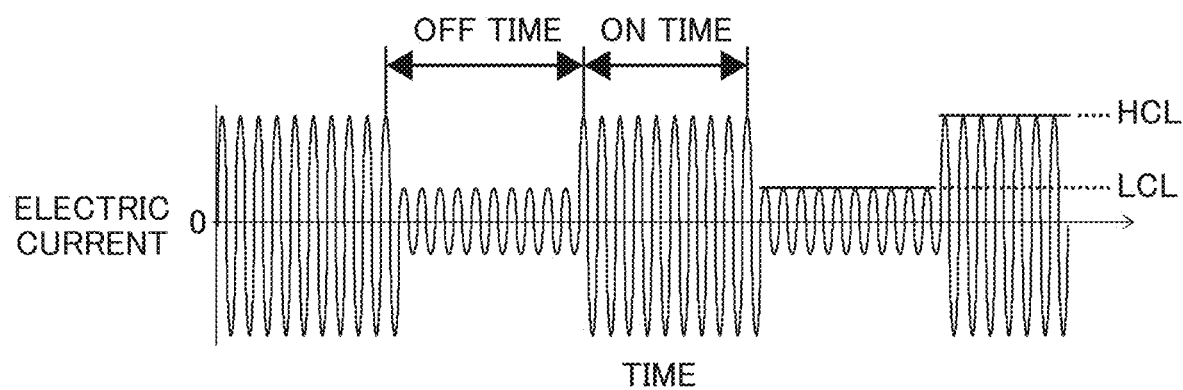
FIG. 3B is a schematic view showing an example of a waveform of high frequency current of a second power source section.

FIG. 3A is a schematic view showing an example of a waveform of high frequency current of the first power source section, and FIG. 3B is a schematic view showing an example of a waveform of high frequency current of the second power source section.

FIG. 3A shows a waveform of the unmodulated high frequency current that is not subjected to amplitude modulation described above, where the amplitude is constant and does not change. FIG. 3B shows a waveform of the amplitude-modulated high frequency current described above, where the amplitude is periodically modulated over time. FIG. 3B shows square wave amplitude modulation. The amplitude modulation is not limited to the square wave amplitude modulation shown in FIG. 3B, and needless to say, use may be made of a waveform formed of a repetitive wave including a curved line having a triangle wave, a sawtooth wave, a reverse sawtooth wave, a sine wave or the like.

In the amplitude-modulated high frequency current, the high value of the current amplitude is defined as a higher current level (HCL), the low value of the current amplitude is defined as a lower current level (LCL), and the time with HCL and the time with LCL in one modulation cycle are respectively defined as the ON time and the OFF time. Further, the percentage of the ON time in one cycle: (ON time/(ON time+OFF time)×100(%)) is defined as a duty factor (DF). The ratio (LCL/HCL×100(%)) in the amplitude is defined as a current modulation ratio (SCL). The current modulation ratio (SCL) represents the degree of modulation of current amplitude, where 100% SCL represents an unmodulated state and 0% SCL represents that the current amplitude is most largely modulated. At 0% SCL, the current value of high frequency current is 0 ampere (A) during the OFF time, i.e., in a region where the current amplitude of high frequency current is low, which will be described later. The amplitude modulation is not particularly limited as long as the SCL value is not less than 0% SCL and less than 100% SCL, and 0% SCL is most preferable because a value closer to 0% SCL refers to a higher degree of modulation, i.e., larger amplitude modulation.

The ON time (see FIG. 3B) corresponds to a region where the current amplitude of high frequency current is high, and the OFF time (see FIG. 3B) corresponds to a region where the current amplitude of high frequency current is low. The ON time, the OFF time and one cycle described above are each preferably on the order of microseconds to several seconds.

The ambient pressure inside the plasma torch 14 is suitably determined depending on manufacturing conditions of fine particles and is, for example, not higher than the atmospheric pressure. The atmosphere with a pressure of not higher than the atmospheric pressure is not particularly limited, and for example, the pressure may range from 5 Torr (666.5 Pa) to 750 Torr (99.975 kPa).

As to the chamber 16, as shown in FIG. 1, from the side closer to the plasma torch 14, an upstream chamber 16a is attached to the plasma torch 14 to be concentric therewith. A downstream chamber 16b is provided perpendicularly to the upstream chamber 16a, and on a further downstream side, there is provided a collection section 18 including a desired filter 18a for collecting fine particles. In the manufacturing apparatus 10, a fine particle collection site is for example the filter 18a.

The chamber 16 is connected with the gas supply section 22. Quenching gas supplied from the gas supply section 22 is used to generate fine particles (not shown) of a material corresponding to the feedstock in the chamber 16. The chamber 16 also serves as a cooling tank.

The collection section 18 includes a collection chamber having the filter 18a, and a vacuum pump 18b connected thereto through a pipe provided at a lower portion of the collection chamber. The fine particles transported from the chamber 16 are sucked by the vacuum pump 18b to be introduced into the collection chamber, and those fine particles remaining on the surface of the filter 18a are collected.

The gas supply section 22 supplies quenching gas to the thermal plasma flame 100 in the chamber 16. The quenching gas serves as cooling gas. The gas supply section 22 includes a gas supply source (not shown) storing gas and a pressure application section (not shown) such as a compressor or a blower which applies push-out pressure to the quenching gas to be supplied into the chamber 16. Further, a regulating valve (not shown) controlling the amount of gas supply from the gas supply source is provided. The gas supply source for use is selected depending on the composition of the quenching gas. The type of the gas is not limited to a single type, and when the quenching gas is a mixed gas, a plurality of gas supply sources are prepared.

The type of the quenching gas is not particularly limited as long as it exercises a cooling function. Inert gases unreactive with the feedstock, such as argon gas, nitrogen gas and helium gas, are usable as the quenching gas, for example. The quenching gas may additionally contain hydrogen gas. The quenching gas may contain reactive gas that reacts with the feedstock. Examples of the reactive gas include hydrocarbon gases such as methane, ethane, propane, butane, acetylene, ethylene, propylene and butene.

The gas supply section 22 supplies the quenching gas (cooling gas) at an angle of, for example, 45 degrees toward a tail portion 100b of the thermal plasma flame 100 (see FIG. 2), i.e., the end of the thermal plasma flame 100 on the opposite side from the plasma gas supply port 14d, that is, a terminating portion of the thermal plasma flame 100, and also supplies the quenching gas (cooling gas) downward along an inner wall of the chamber 16. However, the configuration is not limited to supplying the quenching gas to the terminating portion of the thermal plasma flame 100.

The quenching gas supplied from the gas supply section 22 into the chamber 16 quenches the mixture having been transformed to a gas phase state with the thermal plasma flame 100, thereby obtaining fine particles of a material corresponding to the feedstock. Besides, the quenching gas above has additional functions such as contribution to classification of fine particles.

Immediately after fine particles of a material corresponding to the feedstock is generated, if the fine particles collide with each other and form agglomerates, this causes nonuniform particle size, resulting in lower quality. However, since the quenching gas is supplied toward the tail portion 100b (terminating portion) of the thermal plasma flame, the fine particles are diluted with the quenching gas and thereby prevented from colliding with each other to agglomerate together.

In addition, since the quenching gas is supplied along the inner wall surface of the chamber 16, the fine particles are prevented from adhering to the inner wall of the chamber 16 in the process of collection of the fine particles, whereby the yield of the generated fine particles is improved.

The method of supplying the quenching gas to the thermal plasma flame 100 by the gas supply section 22 is not particularly limited, and the quenching gas may be supplied from a single direction. Alternatively, the quenching gas may be supplied from plural directions surrounding the periphery of the thermal plasma flame 100. In this case, plural supply ports for the quenching gas are provided at the outer peripheral surface of the chamber 16 along the circumferential direction, for example, at regular intervals, although the arrangement at regular intervals is not essential.

When the quenching gas is supplied from plural directions, the supply timing is not particularly limited, and the quenching gas is supplied from plural directions in a synchronized manner. Alternatively, the quenching gas may be supplied in a clockwise or counterclockwise order, for instance. In this case, the quenching gas generates a gas flow such as a swirl flow in the chamber 16. When supplied from plural directions, the quenching gas may be supplied in a random order without determining the order of supply.

The gas supply section 22 is not necessarily required if fine particles can be generated without the use of the quenching gas. In the case of the configuration without the gas supply section 22, this reads to simplification of the apparatus configuration of the manufacturing apparatus 10 as well as steps of the fine particle manufacturing method.

As described above, the feedstock supply section 12 supplies the feedstock to the thermal plasma flame 100, for instance, supplies the feedstock in a predetermined amount, i.e., in a fixed amount regardless of time.

The feedstock supply section 12 is not limited to the one supplying a fixed amount of the feedstock and may be one supplying the feedstock into the thermal plasma flame 100 while time-modulating the amount of supply of the feedstock into the thermal plasma flame 100. With this configuration, a large amount of the feedstock can be supplied during the ON time shown in FIG. 3B. Consequently, a large amount of smaller fine particles can be manufactured. In this case, the supply tube 13 is provided with the intermittent supply section 15, for example. The feedstock is supplied into the chamber 16 while being time-modulated by means of the intermittent supply section 15. The change of the amount of supply of the feedstock is not particularly limited and may assume any of sinusoidal, triangular, rectangular and sawtooth waveforms, while the change preferably conforms to the amplitude modulation of high frequency current supplied to the second coil 62. That is, it is preferable that the change of the amount of supply of the feedstock synchronize with the time-based change of the amplitude modulation which is expressed as a function. This configuration makes it easy to adjust the ON time and the timing of supply of the feedstock to each other.

For the intermittent supply section 15, for instance, a solenoid valve (electromagnetic valve) connected to the supply tube 13 is used to time-modulate the amount of supply of the feedstock. The control section 24 controls the opening and closing of the solenoid valve. A ball valve may be used instead of the solenoid valve. Also in this case, the control section 24 controls the opening and closing of the ball valve. The control section 24 time-modulates the amount of supply of the feedstock in such a manner that, for instance, the amount of supply of the feedstock is increased during the ON time and the amount of supply of the feedstock is decreased during the OFF time. Consequently, a large amount of smaller fine particles can be manufactured. Therefore, in the supply of the feedstock, it is preferable that the amount of supply of the feedstock be increased during the ON time and the amount of supply of the feedstock be decreased during the OFF time. Thus, the feedstock is supplied during the ON time, whereby a large amount of the feedstock can be evaporated, and this allows generation of a large amount of fine particles, so that a large amount of fine particles can be efficiently manufactured.

Next, a fine particle manufacturing method using the manufacturing apparatus 10 above is described taking metal fine particles as an example.

First, for example, Si powder having a volume mean diameter of not more than 30 μm is put into the feedstock supply section 12 as the feedstock powder for metal fine particles.

For instance, argon gas is used as the plasma gas. The first power source section 21a supplies the first coil 60 with high frequency current whose amplitude is not modulated. The second power source section 21b supplies the second coil 62 with amplitude-modulated high frequency current. As a consequence, the thermal plasma flame 100 is generated in the plasma torch 14. The amplitude modulation of the high frequency current supplied to the second coil 62 is for example at 50% SCL, the modulation cycle is 15 ms, the ON time is 10 ms, and the OFF time is 5 ms.

Next, the Si powder is transported with gas, e.g., argon gas used as the carrier gas and supplied into the thermal plasma flame 100 in the plasma torch 14 through the supply tube 13 (first step). The supplied Si powder is evaporated in the thermal plasma flame 100 and becomes the mixture 45 (see FIG. 2) in a gas phase state. The mixture 45 (see FIG. 2) in a gas phase state is cooled (second step). As a result, Si fine particles (metal fine particles) are obtained.

Then, the Si fine particles obtained in the chamber 16 are collected on the filter 18a of the collection section 18 owing to negative pressure (suction force) applied from the collection section 18 by the vacuum pump 18b.

As described above, the thermal plasma flame 100 can be periodically switched in a stable state between the high temperature state and the low temperature state having a lower temperature than that in the high temperature state; therefore, it is possible to control the particle size of fine particles and obtain fine particles having excellent uniformity in particle size.

The cooling of the mixture 45 (see FIG. 2) in a gas phase state (second step) is not particularly limited and may be natural cooling that allows the mixture to cool without using a cooling medium such as quenching gas. In the case of using no quenching gas, the temperature of the thermal plasma flame 100 during the OFF time can be reduced with the temperature of the thermal plasma flame 100 during the ON time being maintained by decreasing the value of SCL, i.e., increasing the degree of modulation of high frequency current of the second coil; therefore, Si fine particles (metal fine particles) with smaller size can be obtained even without cooling using the quenching gas. In this case, steps of the fine particle manufacturing method can be simplified.

Alternatively, for instance, argon gas may be supplied as the quenching gas from the gas supply section 22 to the tail portion 100b of the thermal plasma flame 100 (see FIG. 2), i.e., the terminating portion of the thermal plasma flame 100 to quench the mixture 45 (see FIG. 2). Consequently, the thermal plasma flame 100 is quenched whereby Si fine particles (metal fine particles) are generated. At this time, a low temperature region is formed in the chamber 16, so that still smaller Si fine particles (metal fine particles) can be obtained.

When the Si powder is supplied into the thermal plasma flame 100 in the plasma torch 14, it is preferable to increase the amount of supply of the Si powder during the ON time and decrease the amount of supply of the Si powder during the OFF time, as described above. Alternatively, the supply of the Si powder may be controlled such that the Si powder is supplied during the ON time and not supplied during the OFF time. In any case, it takes time after the solenoid valve is opened until the feedstock is actually transported and the amount of supply of the feedstock into the thermal plasma flame 100 increases, and therefore, the solenoid valve and the like need to be controlled taking the time required for the transportation into account.

Figure 4A:
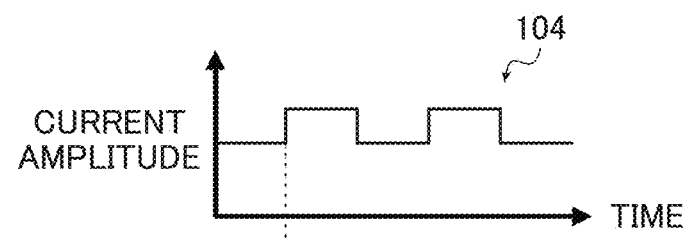
FIG. 4A is a graph showing an example of a waveform of high frequency current of the second power source section.
Figure 4B:
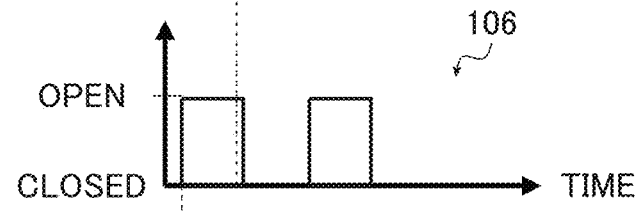
FIG. 4B is a graph showing opening and closing timing of a valve.
Figure 4C:
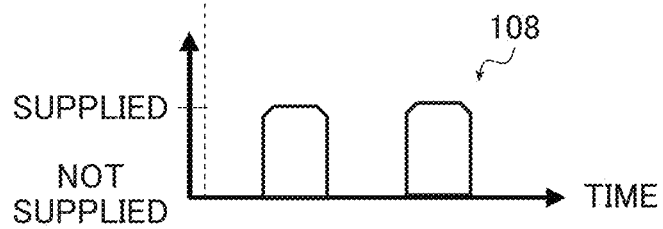
FIG. 4C is a graph showing the supply of feedstock.

FIG. 4A is a graph showing an example of a waveform of high frequency current of the second power source section, FIG. 4B is a graph showing opening and closing timing of a valve, and FIG. 4C is a graph showing the supply of feedstock.

In the embodiment, for example, the opening and closing timing of a valve is determined taking the transportation time into account on the basis of a waveform signal 104 of the second coil 62 which is subjected to square wave amplitude modulation shown in FIG. 4A, a timing signal 106 for opening and closing the valve is obtained as shown in FIG. 4B, and the valve is opened and closed at predetermined time intervals. Consequently, for instance, the feedstock powder is supplied into the plasma torch 14 during the ON time in a waveform 108 shown in FIG. 4C, and as a result, the feedstock can be intermittently supplied.

Next, the relationship between high frequency current supplied from the plasma generation section 21 of the manufacturing apparatus 10 and input power to the thermal plasma flame is described.

Figure 5A:
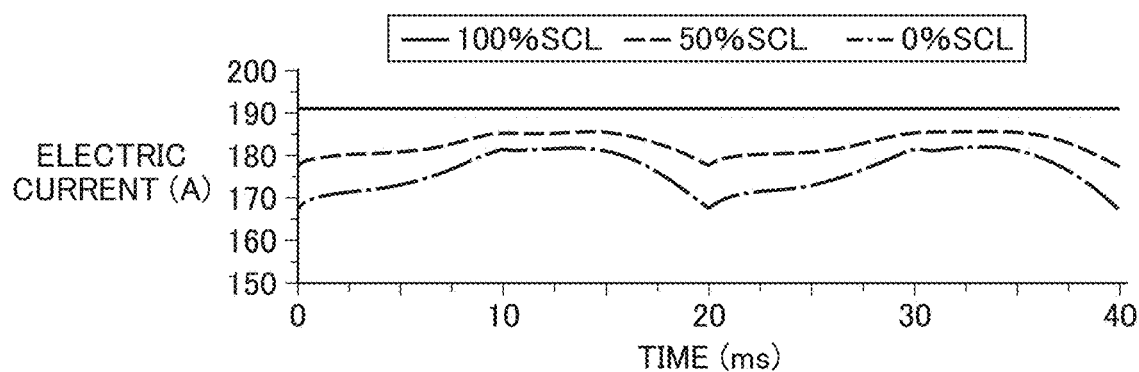
FIG. 5A is a schematic view showing examples of waveforms of high frequency currents of a first coil.
Figure 5B:
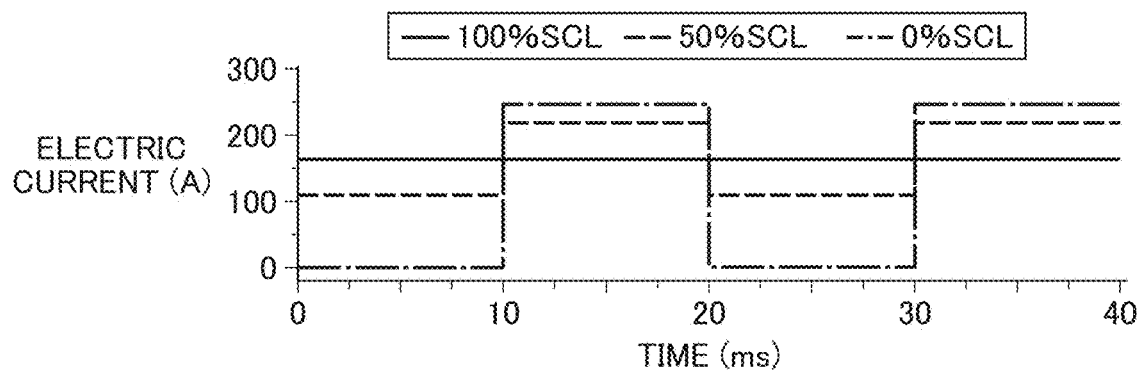
FIG. 5B is a schematic view showing examples of waveforms of high frequency currents of a second coil.
Figure 5C:
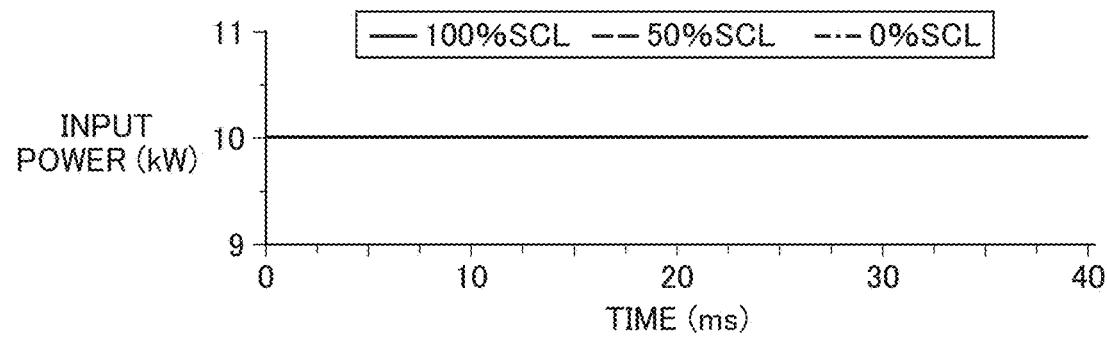
FIG. 5C is a schematic view showing examples of waveforms of input power from the first coil.
Figure 5D:
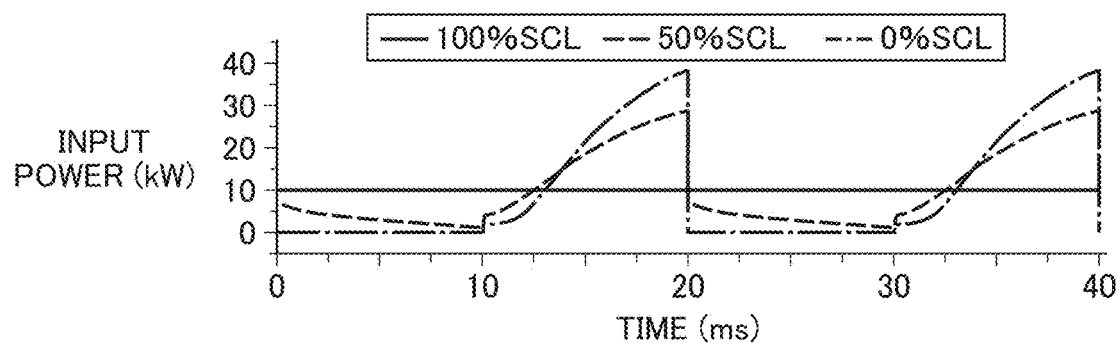
FIG. 5D is a schematic view showing examples of waveforms of input power from the second coil.

FIG. 5A is a schematic view showing examples of waveforms of high frequency currents of the first coil, FIG. 5B is a schematic view showing examples of waveforms of high frequency currents of the second coil, FIG. 5C is a schematic view showing examples of waveforms of input power from the first coil, and FIG. 5D is a schematic view showing examples of waveforms of input power from the second coil. The vertical axis of FIGS. 5A and 5B represents a current value, and this is an effective value represented by a root mean square of the mean of squares of current values. The vertical axis of FIGS. 5C and 5D represents input power, and this is an effective value represented by a root mean square of the mean of squares of electric power values.

FIGS. 5A to 5D were obtained by analysis using an electromagnetic thermal fluid model described below as the analysis model.

[Electromagnetic Thermal Fluid Model]

The electromagnetic thermal fluid model was provided with a cross section of the plasma torch 14 and the chamber 16 shown in FIG. 1 being taken as an object. For a plasma torch, the inner diameter was set to 70 mm and the length to 440 mm, and for a chamber, the inner diameter was set to 130 mm and the length to 810 mm. The outer walls of the plasma torch and the chamber and a tube for supplying feedstock were defined as being cooled with water. As the sheath gas, Ar gas was provided from the top of the plasma torch to flow in an axial direction and a swirl direction. As the carrier gas, Ar gas was introduced into the plasma torch from the center of a plasma torch head through the water-cooled tube for feeding feedstock. The depth of insertion of the water-cooled tube was set to 185 mm. The Ar gas (carrier gas) plays a role in introducing feedstock powder in generation of fine particles.

A numerical space in the electromagnetic thermal fluid model was divided into 114 in the axial direction and into 65 in the radial direction. The temperature in the plasma torch sharply varies in the radial direction. Therefore, the mesh size in the axial direction and the radial direction was set to 10 mm×1 mm.

In the electromagnetic thermal fluid model, the following conditions were assumed as a thermal plasma model.

It is in a local thermal equilibrium state. That is, the temperatures such as the electron temperature, the gas temperature, and the excitation temperature are the same. In addition, all reactions have reached a reaction theory equilibrium state.

Plasma is optically thin, and a light absorption effect is ignored.

The flow is a laminar flow, and a turbulent flow is not considered.

It is cylindrical axisymmetric.

Under those four assumptions, a Poisson's equation was formed for the mass, the momentum, the energy conservation equation, and the vector potentials generated separately by two coil currents, and the analysis was carried out based on the calculation conditions below.

[Calculation Conditions]

The time step of a transient analysis was set to 50 µs. The average input power to a thermal plasma flame was set to 10 kW for a first coil and 10 kW for a second coil. The pressure inside the plasma torch was set to a constant value of 300 Torr. The frequency of high frequency current supplied to the first coil was set to 430 kHz, and the frequency of high frequency current supplied to the second coil was set to 300 kHz.

Ar gas was introduced as the carrier gas at a rate of 4 liter/min. The plasma gas was defined as being not supplied. Ar gas was introduced as the sheath gas at a rate of 90 liter/min. The temperature of each Ar gas introduced was set to a constant value of 300 K.

In this calculation, the current amplitude was changed for each time step such that the input power of the first coil was to be constant at 10 kW. The high frequency current of the second coil was subjected to square wave amplitude modulation such that the average electric power in one cycle was to be 10 kW. The modulation cycle was set to 20 ms, the ON time to 10 ms, and the OFF time to 10 ms. As a calculation parameter, the SCL of high frequency current of the second coil was set to three values, i.e., 100%, 50% and 0%.

FIGS. 5A to 5D show effective values of high frequency currents of the first coil and the second coil and effective values of input power to the thermal plasma flame. As described above, it is in an unmodulated state at 100% SCL, while the current amplitude is most largely modulated at 0% SCL. The period of time from 0 ms to 10 ms is OFF time, and that from 10 ms to 20 ms is ON time. FIG. 5B shows amplitude changes of high frequency currents of the second coil as set.

FIG. 5A shows effective values of high frequency currents of the first coil, where each high frequency current is changed such that the input power of the first coil is to be constant at 10 kW as described above. At this time, each value of the input power based on the associated high frequency current of the first coil is constant at 10 kW as shown in FIG. 5C and is as set. In accordance with the square wave amplitude modulation of high frequency currents of the second coil, the values of the input power from the second coil to the thermal plasma flame change over time in the form of triangular wave, as shown in FIG. 5D.

By subjecting the high frequency current of the second coil to the square wave amplitude modulation as described above, a temperature field of the second coil is changed in such a manner that a high temperature field is obtained during a high current period and a low temperature field is obtained during a low current period. By increasing the degree of modulation of high frequency current of the second coil, it is possible to more largely change the temperature field provided by the second coil. The foregoing results suggest that in a fine particle generation process, feedstock can be more reliably evaporated by supplying the feedstock during a high current period, while the growth of fine particles in a growing stage can be suppressed during a low current period. Thus, a more efficient fine particle generation process can be achieved by amplitude-modulating the high frequency current of the second coil and increasing the degree of modulation of the amplitude modulation.

Next, a temperature distribution and a flow field of an analysis model are described.

FIGS. 6A to 6D are schematic views each showing an example of the temperature distribution and that of the flow field at 50% SCL in the analysis model of a plasma torch. FIGS. 7A to 7D are schematic views each showing an example of the temperature distribution and that of the flow field at 0% SCL in the analysis model of the plasma torch.

FIGS. 6A to 6D and FIGS. 7A to 7D are each divided into a left area 70 and a right area 72 with respect to the 0 mm radial position. The left area 70 shows a temperature distribution, and the right area 72 shows a flow field. The region from the position of 0 mm or more to the position of less than 180 mm in the axial direction is a first coil region 61 where the first coil 60 is disposed, and the region between the positions 180 mm and 350 mm in the axial direction is a second coil region 63 where the second coil 62 is disposed.

FIGS. 6A and 7A show the temperature distributions and the flow fields at the time 0 ms, and FIGS. 6B and 7B show the temperature distributions and the flow fields at the time 5 ms. FIGS. 6C and 7C show the temperature distributions and the flow fields at the time 10 ms, and FIGS. 6D and 7D show the temperature distributions and the flow fields at the time 15 ms. The modulation cycle is 20 ms, the ON time is 10 ms, and the OFF time is 10 ms.

In the temperature distribution, in the case of 50% SCL, a high temperature field 80 at 8000 K or higher is widely distributed in the second coil region 63 at the time 0 ms (the area 70 of FIG. 6A). During the OFF time (from the time 0 ms to 10 ms) subsequent thereto, the temperature of the second coil region 63 decreases, and at the time 10 ms (the area 70 of FIG. 6C), the temperature of the second coil region 63 decreases to 6000 to 8000 K. During the ON time (from the time 10 ms to 20 ms), the high temperature field with a decreased temperature is again heated, and a high temperature field extending long in the axial direction is formed at the time 20 ms, that is, the initial time (0 ms).

In the case of 0% SCL with a higher degree of modulation, the high temperature field 80 at 8000 K or higher in the second coil region 63 is wider than that in the case of 50% SCL at the time 0 ms (the area 70 of FIG. 7A). It can be seen that during the OFF time subsequent thereto, the temperature of the second coil region 63 decreases more rapidly and more sharply than in the case of 50% SCL. At the time 10 ms (the area 70 of FIG. 7C), the temperature of the second coil region 63 remarkably decreases to 4000 to 8000 K. During the ON time, the temperature in the second coil sharply increases, and a wide high temperature field 80 at 8000 K or higher is again formed.

In the flow field, in the case of 50% SCL, the flow rate of a downward flow in the axial direction is 50 m/s or more, i.e., very fast in the second coil region 63 at the time 0 ms (the area 72 of FIG. 6A). The flow rate in this region decreases during the OFF time (from the time 0 ms to 10 ms). This is because, mainly, a decrease in the thermal plasma temperature causes an increase in the density, and the flow rate decreases so as to satisfy a mass conservation equation. On the other hand, during the ON time (from the time 10 ms to 20 ms), since the temperature again increases, the flow rate increases accordingly.

In the case of 0% SCL with a higher degree of modulation, the flow rate of a downward flow in the axial direction in the second coil region 63 is greater than that in the case of 50% SCL at the time 0 ms (the area 72 of FIG. 7A). This is because the temperature is higher in the case of 0% SCL than in the case of 50% SCL when those two cases are compared.

At the time 10 ms (the area 72 of FIG. 7C), however, the flow rate of a downward flow in the axial direction is almost the same as compared to the case of 50% SCL. It can be seen that regardless of whether the condition is 50% SCL or 0% SCL, the flow rate of a downward flow in the axial direction in the second coil region 63 increases during the ON time and decreases during the OFF time. The flow rate of a downward flow in the axial direction increases probably due to the phenomenon as follows.

Since the high frequency current increases during the ON time, the magnetic field and the electric field generated in the second coil region 63 become strong. Due to the stronger magnetic field and electric field, the input power increases. Accordingly, the temperature in this region increases, which causes a decrease in the density, and the flow rate increases so as to satisfy a mass conservation equation. Further, the Lorentz force generated in that region and acting inward in the radial direction becomes stronger. Probably, an increase in the Lorentz force causes an increase in the pressure inside the torch, and the flow rate increases with this increasing pressure. This is probably the reason why the flow rate of a downward flow in the axial direction increases in the second coil during the ON time during which the high frequency current increases.

A temperature history of virtual particles provided into the foregoing analysis model of the plasma torch is described. Specifically, for virtual particles, differences of temperature histories that varied depending on the input timing were obtained. The virtual particles were assumed to be mass points having no mass, and the initial position of the virtual particles was set to the distal end position of the water-cooled tube. Further, it was assumed that the virtual particles entered the thermal plasma flame from the distal end of the water-cooled tube and were transported along the flow.

FIG. 8 is a graph showing examples of temperature histories of virtual particles provided into the analysis model of the plasma torch at 50% SCL, with time; FIG. 9 is a graph showing examples of temperature histories of virtual particles provided into the analysis model of the plasma torch at 0% SCL, with time; and FIG. 10 is a graph showing an example of a temperature history of virtual particles provided into the analysis model of the plasma torch at 100% SCL.

Figure 10:
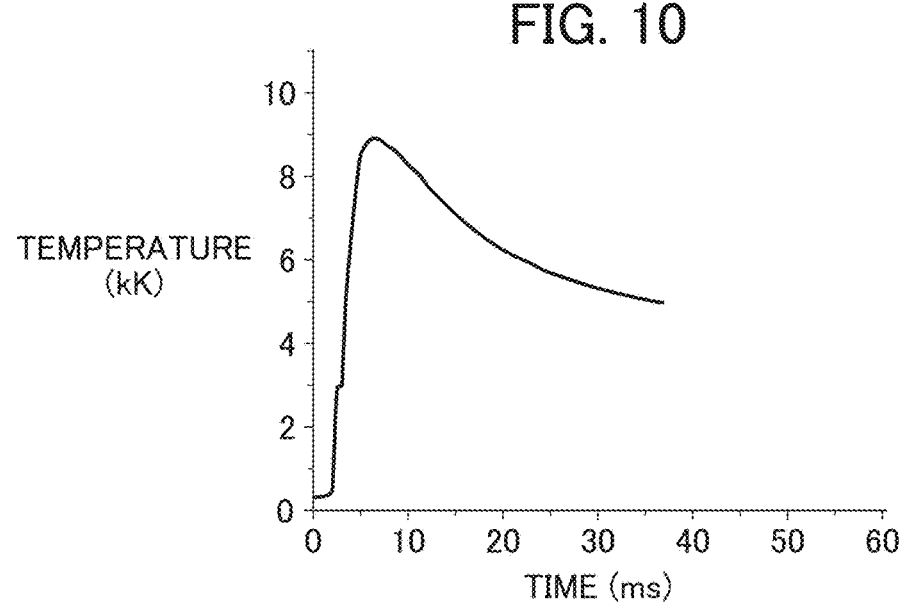
FIG. 10 is a graph showing an example of a temperature history of virtual particles provided into the analysis model of the plasma torch at 100% SCL.

In the case of 100% SCL, as shown in FIG. 10, during the period of time from 0 ms to 7 ms after the input of virtual particles, since the virtual particles flow into the thermal plasma flame, the temperature rapidly increases and reaches about 9000 K at the time 7 ms. Thereafter, the temperature gradually decreases as the virtual particles are transported to the downstream side during the period of time from 7 ms to 38 ms.

Next, in the case of 50% SCL shown in FIG. 8, the temperature history of virtual particles varies depending on the introduction timing of the virtual particles. The introduction timings were set at various points from the time 2.5 ms to the time 20 ms (=0 ms). Note that the virtual particles were introduced at the time 2.5 ms.

The temperature of the virtual particles introduced at the time 2.5 ms increases during the period of time from 2.5 ms to 10 ms and reaches the peak of the temperature history, i.e., 8000 K, at the time 10 ms. When virtual particles are supplied during the OFF time (from the time 0 ms to 10 ms), the peak value of the temperature after its elevation is limited to about 8000 K to about 8500 K. In contrast, when virtual particles are supplied during the ON time (from the time 12.5 ms to 20 ms), the peak value of the temperature after its elevation reaches 9000 K or higher.

When virtual particles are supplied during the period of time from 10.0 ms to 15.0 ms, the decreasing rate of the temperature during its decrease is about −500 K/ms, which is high. When virtual particles are supplied at another timing, e.g., at the time 2.5 ms, the decreasing rate of the temperature during its decrease is about −300 K/ms. These results show that the degree of quenching is high when virtual particles are supplied during the period of time from 10.0 ms to 15.0 ms.

In the case of 0% SCL with a higher degree of modulation as shown in FIG. 9, when virtual particles are supplied during the OFF time (from the time 0 ms to 10 ms), the peak value of the temperature after its elevation is about 6000 K to about 7500 K, which is remarkably low. In contrast, when virtual particles are supplied during the ON time (from the time 10 ms to 20 ms), the peak value of the temperature after its elevation is about 8000 K to about 9200 K, which is higher than that in the cases of 100% SCL and 50% SCL. When virtual particles are supplied during the period of time from 10 ms to 15 ms, the decreasing rate of the temperature during its decrease is higher than that in the case of 50% SCL.

From the foregoing results, it is likely that supply of feedstock during the ON time allows complete evaporation of the feedstock. Further, since feedstock supplied around the ON time can be quenched well compared to that during the unmodulated state, it can be expected that the growth of particles in a growing stage can be further suppressed. Thus, when the high frequency current of the second coil is amplitude-modulated, an efficient nanoparticle generation process can be carried out. Since the temperature of the thermal plasma flame can be further reduced by decreasing the value of SCL of the amplitude modulation, more reliable evaporation and efficient quenching of particles in a growing stage are possible.

Fine particles can be manufactured with the foregoing manufacturing apparatus 10 shown in FIG. 1 as described below. Specifically, the input power to the first coil and that to the second coil were each set to 10 kW, the frequency of high frequency current of the first coil was set to 450 kHz, and the frequency of high frequency current of the second coil was set to 320 kHz.

The current of first high frequency current was set to unmodulated one, and the current of second high frequency current was set to one subjected to square wave amplitude modulation. The modulation cycle was set to 15 ms, the ON time to 10 ms, and the OFF time to 5 ms. The duty factor (DF) was 66%. The SCL representing the degree of modulation was set to 0%. The pressure inside the plasma torch was set to 300 Torr. Ar gas was introduced as the sheath gas at 90 slpm. Furthermore, Si feedstock powder was supplied to a thermal plasma flame, while Ar gas (carrier gas) was supplied thereto at 4 slpm.

As the Si feedstock powder, Si powder having a volume mean diameter of 28 μm was used. The Si feedstock powder was intermittently supplied to synchronize with the ON time. No quenching gas was used. Obtained fine particles are shown in FIG. 11.

For comparison, fine particles were manufactured with the same conditions except that high frequency currents of the first coil and the second coil were both amplitude-modulated and the SCL was set to 80%. Obtained fine particles are shown in FIG. 12. The magnification of each of FIGS. 11 and 12 is 50000 times.

Figure 11:
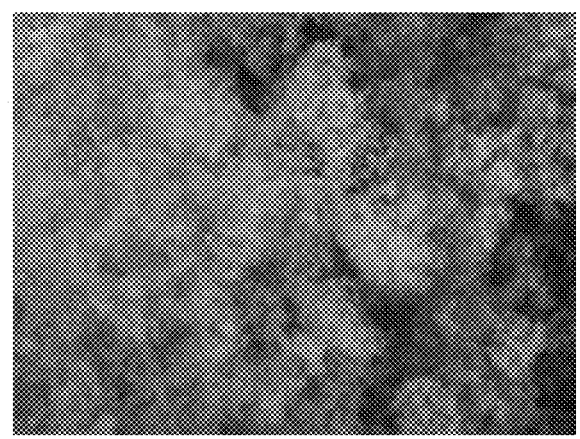
FIG. 11 is a schematic view showing an example of fine particles obtained with the fine particle manufacturing apparatus according to the embodiment of the invention.
Figure 12:
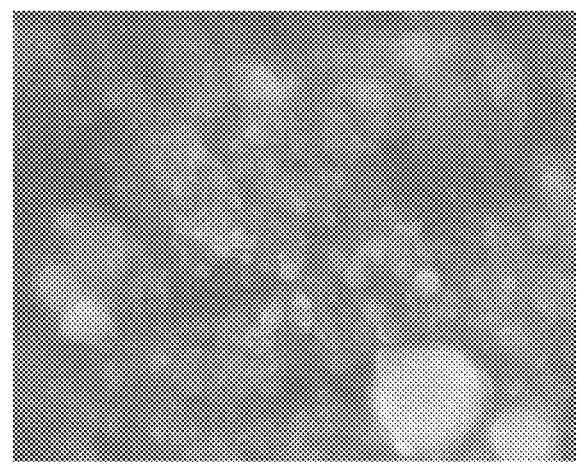
FIG. 12 is a schematic view showing fine particles for comparison.

It can be seen from the fine particles of FIGS. 11 and 12 that while a large amount of fine particles are obtained in each case, the fine particles shown in FIG. 11 have a smaller particle size. The particle generation rate is 300/h in the manufacturing method of the invention and 180 g/h in the comparative manufacturing method; thus, the manufacturing method of the invention provides higher productivity, and a larger amount of fine particles can be manufactured.

Fine particles can also be manufactured as described below. Specifically, the time-averaged input power of the first coil and that of the second coil were each set to 10 kW. The high frequency current of the first coil was unmodulated, and the high frequency current of the second coil was modulated. The modulation cycle was set to 15 ms, the ON time to 10 ms, and the OFF time to 5 ms. The duty factor (DF) was 66%. The SCL was set to 50% and 0%.

The pressure inside the plasma torch was set to 300 Torr. Argon gas was used as the sheath gas and supplied at a flow rate of 90 liter/min. No plasma gas was used.

Argon gas was used as the carrier gas, and the flow rate thereof was set to 4 liter/min.

As feedstock powder, metal grade Si powder (purity: 99.5%) was used. The mean diameter of the feedstock powder was about 19.2 μm. A solenoid valve was operated in synchronization with the modulation of high frequency current (modulated current) of the second coil, and the carrier gas containing the feedstock powder was intermittently supplied into the plasma torch. The amount of supply of the feedstock powder was set to 3.5 g/min and 5.7 g/min. No quenching gas was used.

Fine particles were stably manufactured in an amount of supply of 5.7 g/min. The fact that a large amount of nanosized fine particles were obtained at 0% SCL and 50% SCL was able to be confirmed with FE-SEM images.

Si fine particles with a mean diameter of 62.0 nm were obtained at 50% SCL, and Si fine particles with a mean diameter of 47.4 nm were obtained at 0% SCL. By increasing the degree of modulation, fine particles with a smaller size were obtained without the use of quenching gas.

The manufacturing apparatus 10 of this embodiment is capable of manufacturing, for instance, nanosized Si fine particles using Si powder as the feedstock. However, the invention is not limited thereto, and particles of another element may be used as the feedstock for fine particle manufacturing to manufacture fine particles of an oxide, a metal, a nitride or a carbide of that element. In this case, the fine particle manufacturing may involve slurrying.

When the feedstock is powder, the mean diameter thereof is appropriately set to allow easy evaporation of the feedstock in the thermal plasma flame and is, for example, up to 100 μm, preferably up to 10 μm and more preferably up to 5 μm when converted to the BET diameter.

For instance, any type of feedstock may be used as long as it can be evaporated by the thermal plasma flame, and the following substances are preferred. That is, there may be appropriately selected one of a single element oxide, a complex oxide, a multiple oxide, an oxide solid solution, a metal, an alloy, a hydroxide, a carbonic acid compound, a halide, a sulfide, a nitride, a carbide, a hydride, a metal salt and a metal-organic compound each of which contains at least one selected from the group consisting of the elements with the atomic numbers 3 to 6, 11 to 15, 19 to 34, 37 to 52, 55 to 60, 62 to 79 and 81 to 83.

The single element oxide refers to an oxide formed from one element in addition to oxygen, the complex oxide refers to an oxide constituted of plural types of oxides, the multiple oxide refers to a higher order oxide formed from two or more types of oxides, and the oxide solid solution refers to a solid in which different oxides dissolve in each other to be uniformly mixed. The metal refers to one consisting of one or more metallic elements alone, and the alloy refers to one constituted of two or more metallic elements with the alloy structure assuming, in some cases, the state of a solid solution, a eutectic mixture, an intermetallic compound, or a mixture thereof.

The hydroxide refers to one constituted of a hydroxyl group and one or more metallic elements, the carbonic acid compound refers to one constituted of a carbonic acid group and one or more metallic elements, the halide refers to one constituted of a halogen and one or more metallic elements, and the sulfide refers to one constituted of a sulfur and one or more metallic elements. The nitride refers to one constituted of nitrogen and one or more metallic elements, the carbide refers to one constituted of carbon and one or more metallic elements, and the hydride refers to one constituted of hydrogen and one or more metallic elements. The metal salt refers to an ionic compound containing at least one or more metallic elements, and the metal-organic compound refers to an organic compound having a bond between one or more metallic elements and at least one of elements C, O and N, as exemplified by a metal alkoxide and an organo-metallic complex.

Examples of the single element oxide include a titanium oxide ($TiO_2$), a zirconium oxide ($ZrO_2$), a calcium oxide (CaO), a silicon oxide ($SiO_2$), an aluminum oxide (alumina: $Al_2O_3$), a silver oxide ($Ag_2$), an iron oxide, a magnesium oxide (MgO), a manganese oxide ($Mn_3O_4$), an yttrium oxide ($Y_2O_3$), a cerium oxide, a samarium oxide, a beryllium oxide (BeO), a vanadium oxide ($V_2O_5$), a chromium oxide ($Cr_2O_3$), and a barium oxide (BaO).

Examples of the complex oxide include a lithium aluminate ($LiAlO_2$), an yttrium vanadate, a calcium phosphate, a calcium zirconate ($CaZrO_3$), a titanium lead zirconate, a titanium iron oxide ($FeTiO_3$) and a titanium cobalt oxide ($CoTiO_3$). Examples of the multiple oxide include a barium stannate ($BaSnO_3$), a barium (meta)titanate ($BaTiO_3$), a lead titanate ($PbTiO_3$), and a solid solution in which a zirconium oxide and a calcium oxide dissolve as solids in a barium titanate.

The hydroxide can be exemplified by $Zr(OH)_4$, the carbonic acid compound by $CaCO_3$, the halide by $MgF_2$, the sulfide by ZnS, the nitride by TiN, the carbide by SiC, and the hydride by $TiH_2$.

The present invention is basically configured as above. While the fine particle manufacturing apparatus and the fine particle manufacturing method according to the invention are described above in detail, the invention is by no means limited to the foregoing embodiments and it should be understood that various improvements and modifications are possible without departing from the scope and spirit of the invention.

REFERENCE SIGNS LIST 10 fine particle manufacturing apparatus (manufacturing apparatus)
12 feedstock supply section
13 supply tube
14 plasma torch
14a quartz tube
14b high frequency oscillation coil
14c supply port
14d plasma gas supply port
14e quartz tube
14f cooling water
15 intermittent supply section
16 chamber
16a upstream chamber
16b downstream chamber
18 collection section
18a filter
18b vacuum pump
20 plasma gas supply section
21 plasma generation section
21a first power source section
21b second power source section
22 gas supply section
24 control section
45 mixture
60 first coil
61 first coil region
62 second coil
63 second coil region
70 area
72 area
100 thermal plasma flame
100b tail portion
104 waveform signal
106 timing signal
108 waveform

The invention claimed is:

1. A fine particle manufacturing method using a thermal plasma flame generated inside a plasma torch, there being provided a first coil surrounding a periphery of the plasma torch, a second coil disposed under the first coil and surrounding the periphery of the plasma torch, a first power source section supplying unmodulated high frequency current that is not subjected to amplitude modulation to the first coil, and a second power source section supplying amplitude-modulated high frequency current to the second coil, the first coil and the second coil being arranged side by side in a longitudinal direction of the plasma torch, and the thermal plasma flame being generated by the first power source section and the second power source section, the method comprising:
a first step of supplying feedstock for fine particle manufacturing to the thermal plasma flame generated inside the plasma torch; and
a second step of evaporating the feedstock by use of the thermal plasma flame to transform the feedstock into a mixture in a gas phase state and cooling the mixture,
wherein in the first step and the second step, the first power source section supplies unmodulated high frequency current that is not subjected to amplitude modulation to the first coil and the second power source section supplies amplitude-modulated high frequency current to the second coil.

2. The fine particle manufacturing method according to claim 1,
wherein in the second step, quenching gas is supplied to the thermal plasma flame to cool the mixture in a gas phase state.

3. The fine particle manufacturing method according to claim 1,
wherein in the first step, amplitude-modulated high frequency current is supplied to the second coil by the second power source section, and an amount of supply of the feedstock is increased in a region where current amplitude of the amplitude-modulated high frequency current supplied to the second coil is high.

4. The fine particle manufacturing method according to claim 1,
wherein a current value of the amplitude-modulated high frequency current supplied to the second coil is 0 ampere in a region where current amplitude of the amplitude-modulated high frequency current is low.

5. The fine particle manufacturing method according to claim 1,
wherein in the first step, the feedstock is supplied into the thermal plasma flame with the feedstock being dispersed in a particulate form.

6. The fine particle manufacturing method according to claim 1,
wherein in the first step, the feedstock is dispersed in liquid to obtain a slurry, the slurry is transformed into droplets, and the droplets are supplied into the thermal plasma flame.

7. The fine particle manufacturing method according to claim 2,
wherein in the first step, amplitude-modulated high frequency current is supplied to the second coil by the second power source section, and an amount of supply of the feedstock is increased in a region where current amplitude of the amplitude-modulated high frequency current supplied to the second coil is high.

8. The fine particle manufacturing method according to claim 2,
wherein a current value of the amplitude-modulated high frequency current supplied to the second coil is 0 ampere in a region where current amplitude of the amplitude-modulated high frequency current is low.

9. The fine particle manufacturing method according to claim 2,
wherein in the first step, the feedstock is supplied into the thermal plasma flame with the feedstock being dispersed in a particulate form.

10. The fine particle manufacturing method according to claim 2,
wherein in the first step, the feedstock is dispersed in liquid to obtain a slurry, the slurry is transformed into droplets, and the droplets are supplied into the thermal plasma flame.

* * * * *